United States Patent [19]

Faris

[11] Patent Number: 5,347,525
[45] Date of Patent: Sep. 13, 1994

[54] GENERATION OF MULTIPLE STABILIZED FREQUENCY REFERENCES USING A MODE-COUPLED LASER

[75] Inventor: Gregory W. Faris, Menlo Park, Calif.

[73] Assignee: SRI International, Menlo Park, Calif.

[21] Appl. No.: 19,980

[22] Filed: Feb. 19, 1993

[51] Int. Cl.$^5$ .............................................. H01S 3/098
[52] U.S. Cl. .................................... 372/19; 359/116;
359/154; 359/181; 359/191; 372/18; 372/23;
372/32
[58] Field of Search ...................... 372/8, 9, 18, 19, 20,
372/23, 26, 29, 32; 359/115, 116, 154, 173,
180–182, 189, 191, 193

[56] References Cited

U.S. PATENT DOCUMENTS

| | | | |
|---|---|---|---|
| 3,575,670 | 4/1971 | Hansen | 372/18 |
| 3,975,693 | 8/1976 | Barry et al. | 331/94.5 C |
| 4,268,801 | 5/1981 | Stappaerts | 331/94.5 ML |
| 4,635,246 | 1/1987 | Taylor et al. | 372/18 X |
| 4,677,398 | 6/1987 | Honeycutt et al. | 359/116 X |
| 4,839,884 | 6/1989 | Schloss | 370/3 |
| 4,930,131 | 5/1990 | Sizer, II | 372/18 |
| 4,955,014 | 9/1990 | Kuppers et al. | 359/116 |
| 5,010,543 | 4/1991 | Hill | 370/3 |
| 5,014,277 | 5/1991 | Van Driel et al. | 372/18 |
| 5,029,174 | 7/1991 | Anderson et al. | 372/32 |

OTHER PUBLICATIONS

S. A. Zenchenko et al., "Mode-locked laser for very-wide-band communication systems", *Sov. J. Quantum Electron.*, vol. 7, No. 6, Jun. 1977, 679–681.

A. I. Ferguson et al., "A subpicosecond dye laser directly pumped by a mode-locked argon laser", *J. Appl. Phys.*, 49(11), Nov. 1978, pp. 5389–5391.

J. N. Eckstein et al., "Production of Deep Blue Tunable Picosecond Light Pulses by Synchronous Pumping of a Dye Laser", *Optics Communications*, vol. 27, No. 3, Dec. 1978, pp. 466–468.

B. Couillaud et al., "A frequency-locked mode-locked cw dye laser for high-resolution spectroscopy in the frequency domain", *Appl. Phys. Lett.* 36, No. 1, Jan. 1, 1980, pp. 1–3.

A. I. Ferguson et al., "Active Mode Stabilization of a Synchronously Pumped Mode Locked Dye Laser", *Optics Communications*, vol. 41, No. 4, Apr. 15, 1982, pp. 271–276.

S. R. Bramwell et al., "Frequency Offset Locking of a Synchronously Pumped Mode-Locked Dye Laser", *Optics Communications*, vol. 56, No. 2, Nov. 15, 1985, pp. 112–116.

D. M. Kane et al., "FM Dye Lasers", *Appl. Phys. B 39*, 1986, pp. 171–178.

(List continued on next page.)

*Primary Examiner*—John D. Lee
*Attorney, Agent, or Firm*—Townsend and Townsend Khourie and Crew

[57] ABSTRACT

A technique for generating a large number of stabilized optical frequencies suitable for use in a wide variety of applications, including a multi-channel optical communications system, optical processing, optical computing, and heterodyne generation of stabilized RF frequencies. The technique contemplates stabilizing the cavity of a master laser and using the cavity modes as the carrier frequencies. Preferably, the modes are coupled, as by mode-locking, in order to prevent the modes from competing with each other for the laser gain, which would cause large amplitude variations. Since the cavity is stabilized, all of the cavity modes are stabilized. In one set of embodiments, the master laser is used directly as the laser source, the components at the different mode frequencies are spatially separated (demultiplexed) so that the component at each mode frequency can be individually amplified and modulated (e.g., by electro-optic (EO) modulators). In a second set of embodiments, a set of slave lasers is locked to respective modes. Each of these slave lasers may be individually modulated (e.g., by injection current modulation). The multifrequency source is useful even when the modes are not individually modulated, but serve only as heterodyne reference frequencies, as for example in radar applications.

40 Claims, 5 Drawing Sheets

OTHER PUBLICATIONS

J. C. Chung et al "Frequency-Locking of 1.5-μm InGAAsP Lasers to an Atomic Krypton Line Without Dithering the Laser Frequency", *IEEE Photonics Technology Letters,* vol. 2, No. 6, Jun. 1990, pp. 435–437.

"Frequency-Locking of External Cavity Semiconductor Lasers Using an Optical Comb Generator", *Electronics Letters,* Mar. 27, 1986, vol. 22, No. 7, pp. 388–390, D. J. Hunkin et al.

R. Welter et al., "Sixteen-Channel Coherent Broadcast Network at 155 Mbit/s", *Journal of Lightwave Technology,* vol. 7, No. 10, Oct. 1989, pp. 1438–1444.

R. Welter et al., "Performance of Erbium–Doped Fibre Amplifier in 16–Channel Coherent Broadcast Network", *Electronics Letters,* Sep. 28, 1989, vol. 25, No. 20, pp. 1333–1335.

Y. C. Chung, "Frequency-Locked 1.3–and 1.5μm Semiconductor Lasers for Lightwave Systems Applications", *Journal of Light-Wave Technology,* vol. 8, No. 6, pp. 869–876, Jun. 1990.

Laurence R. Brewer, "Highly coherent injection–locked laser diode arrays", *Applied Optics,* vol. 30, No. 3, Jan. 20, 1991, pp. 317–320.

D. M. Kane et al., "FM Dye Lasers for Use in Optical Metrology", Department of Physics, University of Southampton, Southampton, S09 5NH, England, pp. 362–365, *Laser Spectroscopy VIII (1985).*

A. I. Ferguson et al., "Active Mode Stabilization of Synchronously Pumped Dye Lasers", Clarendon Laboratory, Parks Road, Oxford OX1 3PU, United Kingdom, pp. 31–35, *Picosecond Phenomena III,* Jun. 1982.

Laurence R. Brewer, "Suppression of beam steering in an injection–locked laser diode array", *Appl. Phys. Lett.* 59 (24), Dec. 9, 1991, pp. 3078–3080.

R. J. Fischer et al., "Doping and free-carrier loss in cw all–epitaxial surface-emitting laser diodes", *CLEO '91,* p. 352, Paper No. JThB5, May 1991.

Thomas J. Kane et al, "Fast frequency tuning and phase locking of diode-pumped Nd:YAG ring lasers", *Optics Letters,* vol. 13, No. 11, Nov. 1988, pp. 970–972.

Anthony E. Siegman, "Lasers", chapter 27: Active Laser Mode Coupling ©1986 by University Science Books, Mill Valley, Calif., pp. 1056–1101.

FREQUENCY →

TIME →

$\Delta\nu \sim 1/\tau$

FREQUENCY →

$\tau$

TIME →

$\Delta\nu \sim 1/\tau$

FREQUENCY →

$\tau$

TIME →

GENERATION OF MULTIPLE STABILIZED FREQUENCY REFERENCES USING A MODE-COUPLED LASER

BACKGROUND OF THE INVENTION

The invention relates generally to lasers, and more specifically to a laser source suitable for multi-channel optical communication.

Wavelength division multiplexing (WDM), which uses multiple stable optical frequencies to transmit many channels through a single fiber for optical communications and control, requires stabilization of many optical carrier frequencies to a frequency range much smaller than the carrier spacing. WDM is of increasing importance for a number of applications including high bandwidth and highly parallel communications, efficient optical processing, and message encryption and security.

Coherent detection, which has a number of advantages including the detection of small signals and close spacing of carriers, has especially high requirements on frequency stabilization. Although work on stable optical sources based on diode lasers has been in progress for over a decade, there is still no method for accurate absolute frequency control of many optical sources, and existing sources do not have both good tuning and line width characteristics.

Absolute stabilization can be performed using either a temperature-stabilized cavity or an atomic or molecular resonance. Because stabilized cavities are length references and not frequency references, they are not satisfactory as high accuracy frequency references due to uncertainties and unreliability involved in aging and the need for periodic calibration. Atomic and molecular resonances, which are true frequency references, are the best absolute reference when their use is practical. Recent work has demonstrated that hollow cathode lamps for frequency references can De as small as a miniature lamp, consuming only a few milliwatts of power. In addition, by using a Zeeman dither, stabilization can be performed without dithering the laser. The noble gases Ne, Ar, Kr, and Xe provide many potential atomic resonances for optogalvanic stabilization in the 1.3-$\mu$m and 1.5-$\mu$m regions. Thus, it is possible to obtain very good absolute references using optogalvanic cells.

While atomic resonances provide good absolute frequency references, they only exist at a number of fixed frequencies. Some method is required to fill in the gaps to allow positioning of optical frequencies at desired spacings. This technological problem has not been solved. Current approaches are limited to either a small number of frequencies or low stability. Through the use of an electro-optic modulator and a single stabilized laser, a comb of frequencies can be generated with stability limited only by the laser. Because the intensities of the side band frequencies drop rapidly, only a small number of frequencies (on the order of 5) are generated and the total frequency range is limited.

Other techniques entail creating fixed offsets from a reference frequency. One technique to define the frequency offsets is to scan the frequency of a reference laser and perform heterodyne offset locking of other lasers to the reference laser frequency. Another approach determines The offsets using a scanning Fabry-Perot resonator stabilized to a reference laser. In principle, these techniques can be extended to large numbers of channels, but the absolute stability is limited because the offset locking involves scanning. Scanning means that there will be dead times for each channel during which there is no feedback relative to the frequency reference. This creates limitations on the absolute stability of each channel and creates dead spots in the frequency response of the frequency control loop, making the system very sensitive to perturbations in these frequency regions. It is possible to create offsets using angular multiplexing through a stabilized Fabry-Perot cavity stabilized to an atomic resonance without the problems associated with scanning references. However, the geometric and alignment stability constraints involved indicate that angular multiplexing of large numbers of frequencies (over 10, perhaps) is not practical.

Offsets from a stabilized laser may also be set by locking to the heterodyne beat frequency between the stabilized laser and a second laser. Offsets of up to about 10 GHz can be created by this technique, but larger offsets would require forming chains of offset lasers. Offset-locked chains lead to loss of accuracy in each step and reliability problems because a single break leads to loss of the chain.

The ideal optical frequency source for optical communication would allow generation of tens or hundreds of frequencies, each with very good absolute frequency stability. This appears to be impractical with the modulation and scanning techniques described above.

SUMMARY OF THE INVENTION

The present invention provides a technique for generating a large number of stabilized optical frequencies suitable for use in a wide variety of applications, including a multi-channel optical communications system, optical processing, optical computing, heterodyne generation of stabilized RF frequencies, spread spectrum techniques, channelized receivers, and spectrum analyzers.

In brief, the present invention contemplates stabilizing the cavity of a master laser and using the cavity modes as the carrier frequencies. Preferably, the modes are coupled, as by mode-locking, in order to prevent the modes from competing with each other for the laser gain, which would cause large amplitude variations. Since the cavity is stabilized, all of the cavity modes are stabilized. This produces many stabilized frequencies for the effort required to stabilize a single cavity. The total frequency range covered by the modes is limited only by the laser gain bandwidth, and can thus be very large.

In one set of embodiments of a communications system, the master laser is used directly as the laser source, the components at the different mode frequencies are spatially separated (demultiplexed) so that the component at each mode frequency can be individually amplified and modulated (e.g.) by electro-optic (EO) modulators). The modulated components are then combined and coupled to the optical communications medium (typically an optical fiber). At the receiver, the components at the different mode frequencies are spatially separated and each component sent to a respective detector.

In a second (generally preferred) set of embodiments of a communications system, a first set of slave lasers at the transmitter and a second set of slave lasers at the receiver are locked to respective modes. At the transmitter, the slave lasers in the first set provide the optical power that coupled to the communications medium. Each of these slave lasers is individually modulated (e.g., by injection current modulation) to generate the signals that are communicated on that slave laser's channel. At the receiver, the slave lasers in the second set are used for heterodyne detection. Each slave laser at the receiver illuminates a respective photodetector, which also receives light from the optical communications medium.

A further understanding of the nature and advantages of the present invention may be realized by reference to the remaining portions of the specification and drawings.

DESCRIPTION OF SPECIFIC EMBODIMENTS

Laser Mode-Coupling Overview

The present invention relies on stabilizing the cavity of a phase-coupled laser, which has the effect of stabilizing the cavity modes as well. The individual modes can then serve as individual carrier waves for wavelength division multiplexing for optical communications. The source is useful for spectral (filtering) and coherent detection, and is also useful as a heterodyne source for coherent detection.

Figure 1A:
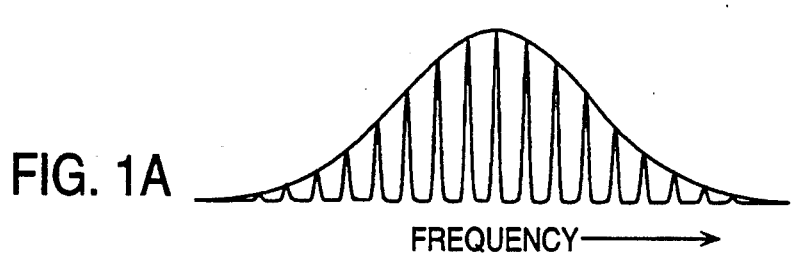
FIGS. 1A and 1B are plots showing the frequency and time profiles for a pulsed multimode laser.
Figure 1B:
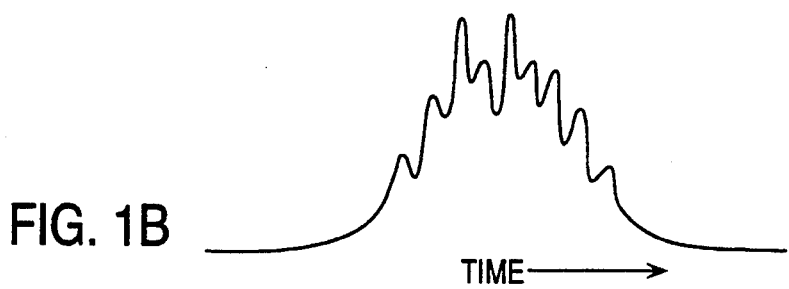
Figure 1C:
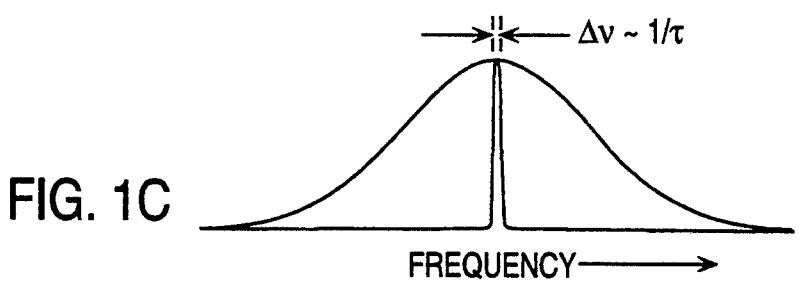
FIGS. 1C and 1D are plots showing the frequency and time profiles for a pulsed single-mode laser.
Figure 1D:
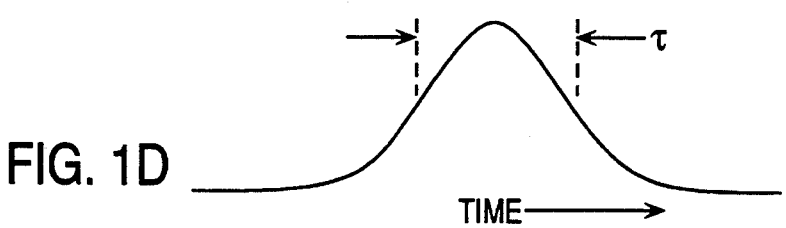

A laser cavity typically supports a number of longitudinal modes with spacing $c/2L$, where L is the length of the cavity. An example of cavity modes is shown in FIG. 1A, which is a frequency profile for a pulsed multimode laser. The envelope of the modes is determined by the gain profile of the laser. The frequencies of all of the modes are determined by a single laser cavity. Thus, stabilization of the laser cavity can create a comb of stabilized frequency references. There is a problem however, in that the cavity modes compete for the laser gain leading to variations in the laser intensity as is shown in FIG. 1B, which is the time profile for the pulsed multimode laser. These fluctuations do not show up for a single-mode laser, the frequency and time profiles for which are shown in FIGS. 1C and 1D, because there is only one cavity mode present.

Figure 1E:
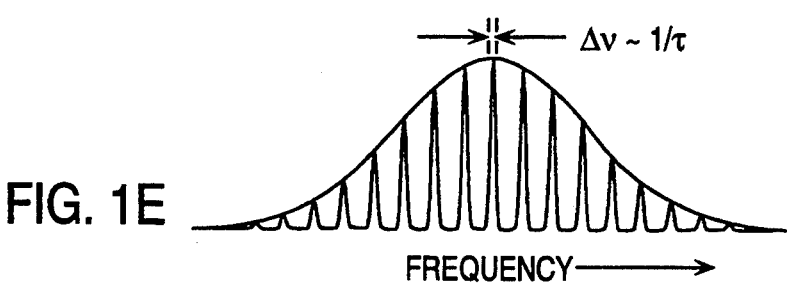
FIGS. 1E and 1F are plots showing the frequency and time profiles for a pulsed multimode laser that is mode-locked.
Figure 1F:
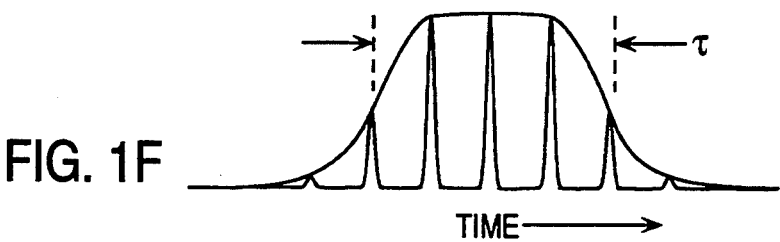

Large intensity variations are not tolerable for narrow linewidth applications because of the frequency bandwidth required to produce the variations. This is equivalent to the Fourier transform limitation, which describes a minimum linewidth for a single laser pulse. The cavity mode competition can be eliminated by coupling the cavity modes together, for example by mode-locking. Mode-locking is a well-known technique for coupling the cavity modes through the use of an amplitude modulator or a phase (or frequency) modulator inside the cavity. This is referred to a AM mode-locking or FM mode-locking (not to be confused with FM laser operation, discussed below). An example of mode-locked laser behavior is shown in the frequency and time profiles of FIG. 1E and 1F. The phases between the cavity modes are coupled such that the output is a train of pulses as is shown in FIG. 1F.

Typically, one does not think of mode-locked pulses as narrowband because the linewidth of a single mode-locked pulse is broad. It is equivalent to the gain profile width (FIG. 1E) in the Fourier transform limit. However, the train of pulses is described by the individual modes under the gain envelope of FIG. 1E. For the illustrated example of a pulsed laser, the narrowest possible width of the single cavity mode is determined by the Fourier transform of the time length of the pulse train in FIG. 1F. In the case of a cw laser, the fundamental limit on the linewidth of a single mode is determined only by the Schawlow-Townes limit. Many experiments have demonstrated the application of mode-locked lasers to narrowband measurements with linewidths as narrow as 2 MHz demonstrated spectroscopically. While these experiments have been demonstrated in the visible using dye lasers, the techniques can be readily applied to the infrared using solid state lasers.

One complication with a mode-locked laser as a source of frequency references is that the peak powers of a single pulse may cause frequency chirps due to self phase modulation or loss and crosstalk due to stimulated scattering processes such as stimulated Raman scattering. Another technique that locks cavity modes to avoid mode competition is FM laser operation (or simply the FM laser). FM laser operation is a frequency-swept mode where the FM modulation frequency is purposely displaced by a small amount (say 1-2%) from the axial mode spacing. For the FM laser, the relative phases of the modes is such that a cw beam is produced with a varying chirp that repeats each cavity round trip time. This chirp is produced by the summation of the individual modes, and each mode is stable and without chirp. Stabilization of FM lasers has also been performed, yielding linewidths of a few MHz. Because the laser output is cw rather than pulsed, an FM laser would be preferable to a mode-locked laser for optical fiber applications.

Choice of Lasers

Because they are compact and inexpensive, much of the work on laser sources for optical communications has been done with diode lasers. However, as frequency references for wavelength multiplexing, solid state lasers have a number of advantages over diode lasers. The fundamental limit on the linewidth for solid state lasers is orders of magnitude narrower than for diode lasers, and linewidths as narrow as 3 Hz have been demonstrated for diode-laser-pumped solid state lasers. While linewidths this narrow are not required for coherent communications, the properties of the solid state lasers that allow such narrow linewidths will allow simpler and more robust frequency sources for communications. Solid state lasers may be constructed as monolithic resonators, making them less susceptible to vibrations. Formation of solid state ring cavities reduces sensitivity to feedback, which is very important for practical communication systems. $Er^{3+}$-doped glass is a good solid state material for mode-coupled lasers for optical communication because it lases in the low loss region for fused silica around 1.5 $\mu$m. There is much interest in this material as a fiber amplifier or fiber laser, where the long gain lengths enhance the operation of the three-level laser system. The $Er^{3+}$-doped glass laser can also operate as a bulk laser, pumped by laser sources, where powers of over 50 mw have been obtained. If an $Er^{3+}$-doped glass laser is used as the frequency reference, then the frequency span of the individual carriers will be matched to the bandwidth of $Er^{3+}$-doped amplifiers which are important for in-line amplification of optical signals.

The spacing between the laser cavity modes is determined by the laser cavity length, and can be in the megahertz to gigahertz range, say between 50 MHz and 100 GHz. The spectral content of the information that can be carried by a given mode is in a range less than the mode spacing, say between 1 KHz and 50 GHz, depending on the mode spacing.

An attractive laser cavity design is a monolithic resonator, which is less sensitive to vibrations than cavities consisting of discrete elements. For a monolithic resonator, with a cavity length of perhaps a few centimeters, the cavity mode spacing would be a few GHz. Larger laser cavities would have more closely spaced frequencies. It would not be necessary to use every frequency for communication, so that mode spacings of 10's of GHz could be used even if the cavity mode spacing were as small as 100 MHz. Furthermore, with the many frequency references, communication bandwidth could be assigned on a flexible basis, with the bandwidth corresponding to a requested number of frequencies given to a particular user on request.

The monolithic resonator cavity may be configured in any convenient geometry, as for example as a ring cavity or a standing-wave cavity. In either event, the cavity is provided with a plurality of polished and coated faces that define the cavity reflectors. The pump laser may be a diode laser having a wavelength corresponding to the absorption bands of the solid-state laser material.

Some form of modulation is required in connection with stabilizing the cavity modes. Suitable techniques include the use of acoustic waves, the electro-optic effect, and the Kerr lens effect (for mode-locking). Stabilization of the cavity may be performed using the following techniques. Temperature control allows variation over a wide range, but the variation is slow. Elastic variation, electro-optic variation, and acoustic waves allow for fast variation, but only over a limited range. Given these characteristics, it is likely that a combination of these techniques would be used.

Multi-Channel Optical Communications System Overview

Figure 2:
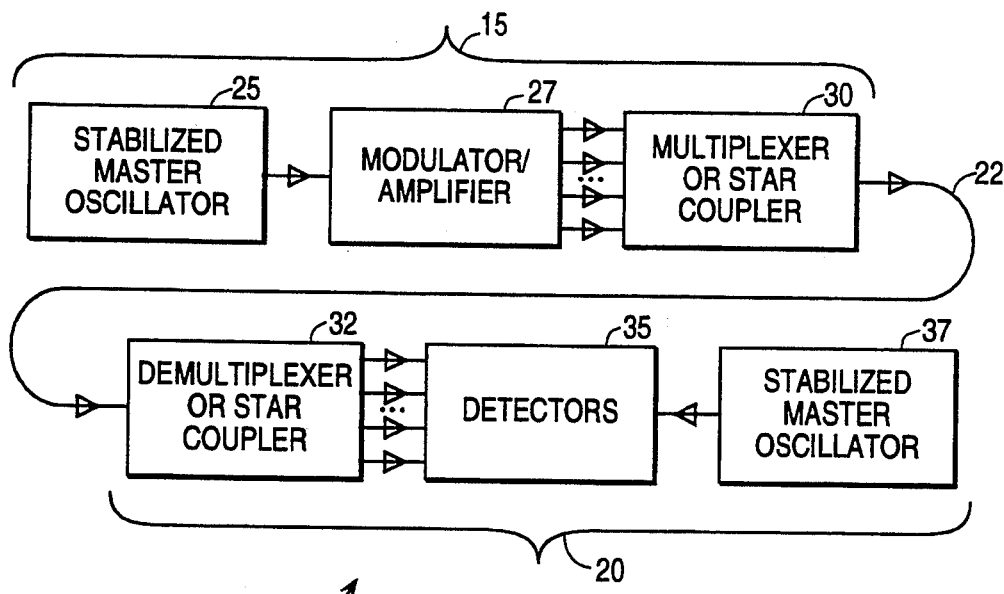
FIG. 2 is an optical and electronic block diagram of a communications system according to the present invention.

FIG. 2 is a high-level optical block diagram illustrating a multi-channel communication system 10 according to the present invention. The system includes a transmitter 15, a receiver 20, and a communications medium 22 (typically an optical fiber). Transmitter 15 includes a stabilized master oscillator 25 capable of providing a plurality of stabilized cavity modes, at least some of which function as carrier frequencies for the multi-channel communication system. The master oscillator is a stabilized multimode laser as will be described in detail below. The cavity modes are amplified (collectively or individually) and individually modulated at a modulation/amplification section 27, and are combined at a multiplexer or star coupler 30 which couples them to communication medium 22. Receiver 20 includes a demultiplexer or star coupler 32 for communicating the individual modes to respective detectors 35 (which may be photodiodes). For a number of reasons discussed below, a preferred detection technique is heterodyne detection, and a stabilized master oscillator 37 at the receiver provides optical signals at a set of frequencies having a predetermined relationship (not necessarily strict equality) with the mode frequencies to effect such detection. As will be discussed below, a separate master oscillator at the receiver may not be necessary.

Stabilization of the Master Oscillator

Figure 3A:
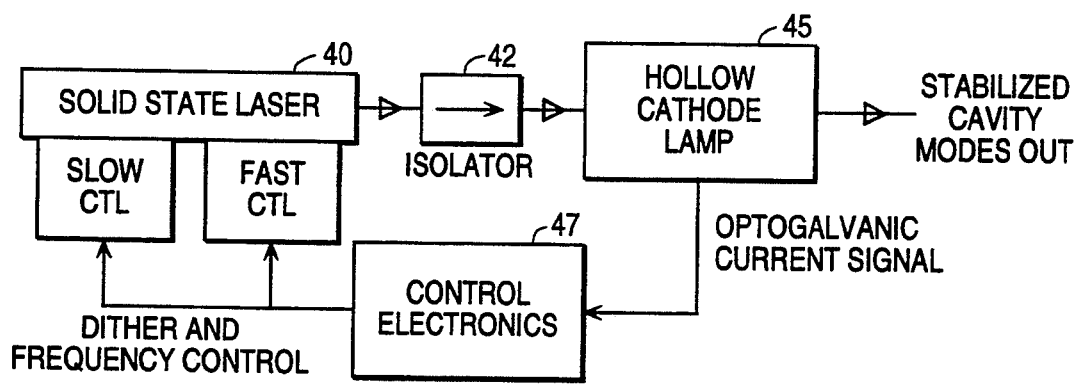
FIGS. 3A and 3B are optical and electronic block diagrams showing techniques for stabilizing the master oscillator.
Figure 3B:
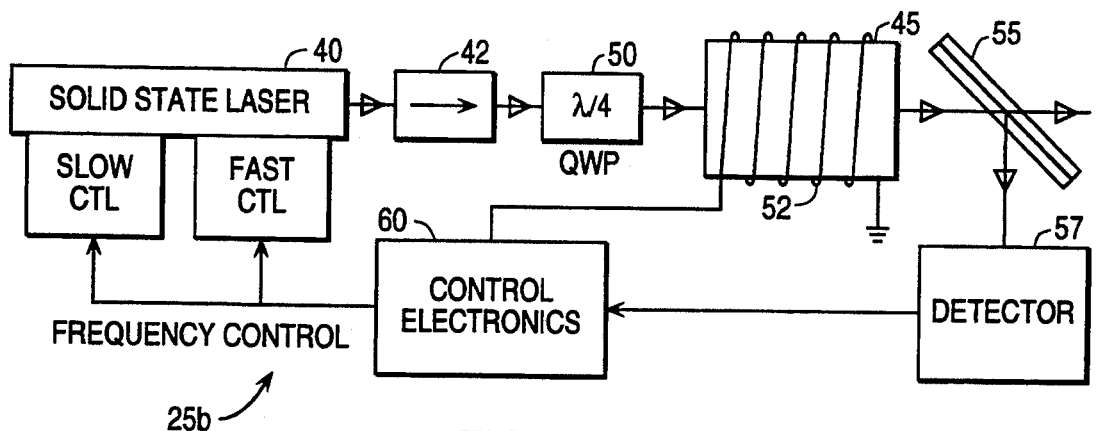

FIGS. 3A and 3B are optical and electronic block diagrams of alternative embodiments 25a and 25b of stabilized master oscillator 25. In short, the illustrated techniques are variations of known techniques for stabilizing a diode laser to an atomic frequency reference. FIG. 3A illustrates a technique where the laser frequency is dithered. The beam from a solid state laser 40 is passed through an isolator 42 to a hollow cathode gas-discharge lamp 45. According to an effect known as the optogalvanic effect, the laser beam passing through the gas discharge in the lamp changes the impedance when the laser beam wavelength corresponds to a particular non-ionizing transition of an atomic or molecular component of the gas. A signal representing the optogalvanic current is communicated to control electronics 47 that detect the signal and control the laser frequency so as to maximize or minimize the signal. It is necessary to dither the laser frequency to detect the lock point. The particular type of lamp depends on the wavelength of the solid state laser. A more detailed description of this technique can be found in W. C. Chung "Frequency-Locked 1.3- and 1.5-$\mu$m Semiconductor Lasers for Lightwave Systems Applications," *Journal of Lightwave Technology*, Vol. 8, No. 6 (1990). The article describes locking InGaAsP diode lasers to the 1.296-$\mu$m argon line and to the 1.5339-$\mu$m krypton line.

Controlling the laser frequency is preferably performed through both slow frequency control, such as temperature control, and fast control, such as variation of the laser cavity length or index of refraction. Use of a piezoelectric material for fast frequency control of monolithic lasers through deformation of the laser is described by T. J. Kane and E. A. P. Cheng, "Fast Frequency Tuning and Phase Locking of Diode-Pumped Nd:YAG Ring Lasers," *Optics Letters*, Vol. 13, No. 11, pp. 970–972 (1988).

FIG. 3B illustrates a technique for frequency-locking solid state laser 40 without dithering the laser frequency. Instead of dithering the laser frequency, this technique uses an AC magnetic field to dither the absorption frequency using the Zeeman effect. To this end, the output from solid state laser 40 is passed through an isolator 42 and a quarter-wave plate 50, which circularly polarizes the light entering hollow cathode lamp 45. A solenoid coil 52 provides the mechanism for imposing the magnetic field on the gas in the lamp. A small portion of the beam passing through the lamp is diverted by a beam splitter 55 and communicated to a detector 57. The detector signal is communicated to control electronics 60, which provides the AC current to the solenoid and further controls the frequency of the laser. A detailed description of this technique can be found in W. C. Chung and R. M. Derosier, "Frequency-Locking of 1.5-μm InGaAsP Lasers to an Atomic Krypton Line Without Dithering the Laser Frequency," *IEEE Photonics Technology Letters*, Vol. 2, No 6, (June 1990) The article describes locking an InGaAsP diode laser to the 1.5244-μm krypton line.

Modulation/Amplification Section

Figure 4A:
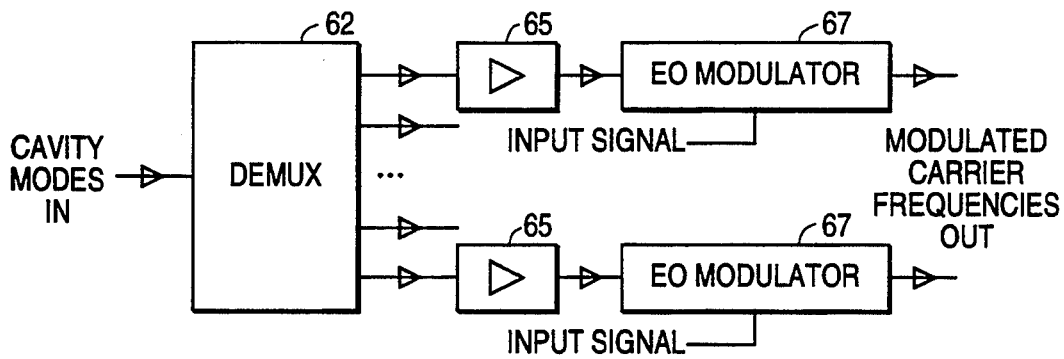
FIGS. 4A and 4B are optical and electronic block diagrams of alternative embodiments of the modulation-/amplification portion of the transmitter.

FIG. 4A is a block diagram of a first embodiment 27a of modulation/amplification section 27. In this embodiment, the output beam from the stabilized master oscillator, which includes a plurality of cavity modes, is communicated to a demultiplexer 62, which spatially separates the modes. Given that the cavity modes are closely spaced, wavelength division demultiplexing may be difficult. If this is the case, a separation etalon that passes modes only at intervals (say every 10th mode) can be interposed in the path of the beam. A beam at each of the desired carrier frequencies is passed through a laser amplifier 65 and an electro-optic (EO) modulator 67. The laser amplifier is generally necessary since each mode has relatively low power, typically not enough to serve as a carrier in the communications system. Modulator 67 receives an electrical input signal corresponding to the data pattern that is intended to be impressed on that carrier wave, and modulates the beam accordingly.

Figure 4B:
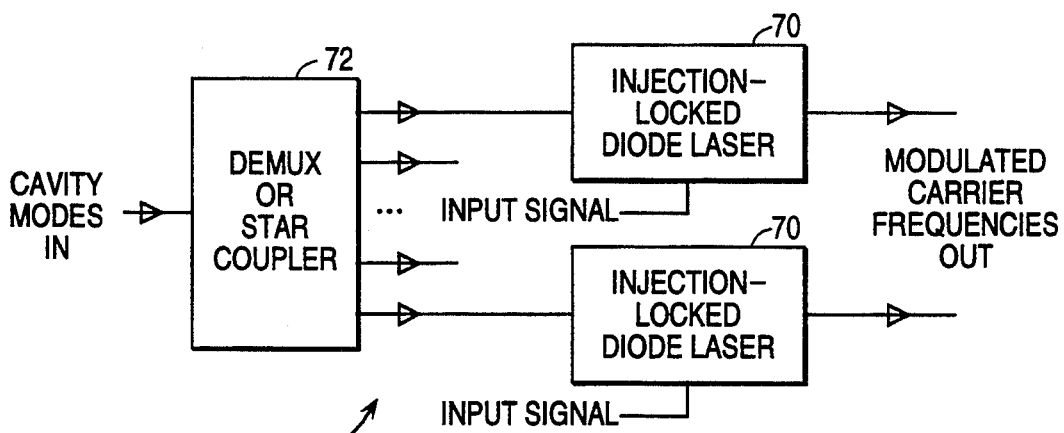

FIG. 4B is a block diagram of an alternative and generally preferred embodiment 27b of modulation/amplification section 27. In this embodiment, a number of diode lasers 70 are injection-locked to the individual modes. The beam from the stabilized master oscillator is communicated through a star coupler or demultiplexer 72 to the diode lasers. Since the individual diode lasers are locked to the modes, each diode laser has imparted to it long term stability governed by the stability of the solid state laser. Each diode laser is individually modulated by current modulation or other suitable technique, and high power in each channel is obtained.

Figure 4C:
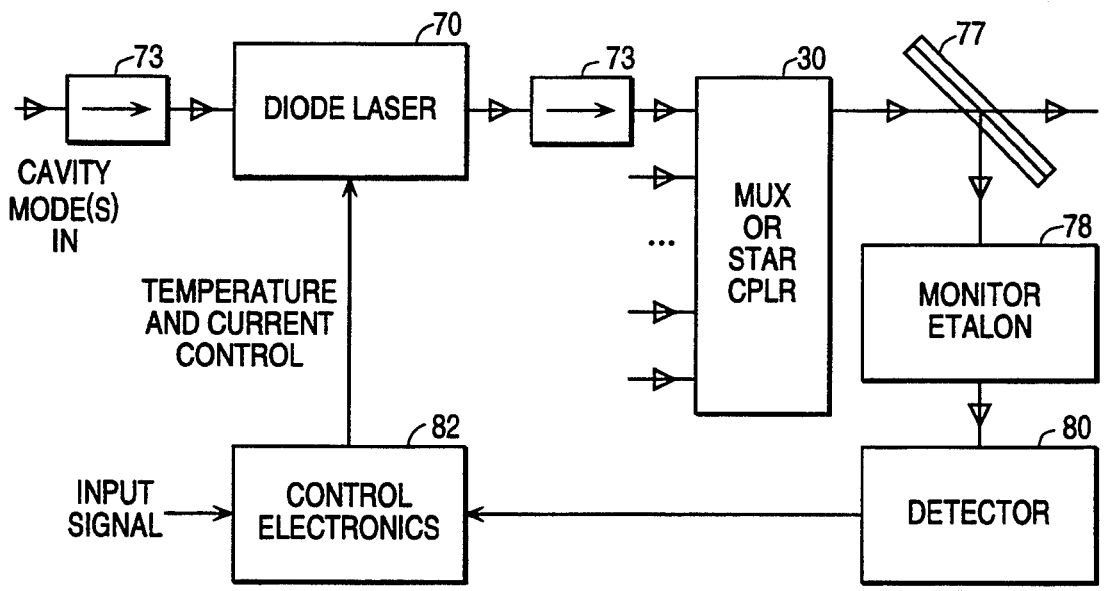
FIG. 4C is an optical and electronic block diagram showing a technique for locking a diode laser.

FIG. 4C illustrates a technique for locking one of the diode lasers to a particular cavity mode. It is assumed that the diode laser is mounted to a thermoelectric cooler or that some other mechanism is provided to regulate the diode laser temperature. A beam component is communicated to diode laser 70, with suitable isolation being provided by isolators 73. The beam component may include a single cavity mode or a plurality of cavity modes, depending on whether the beam from the master oscillator was passed through a demultiplexer or a star coupler.

Although the elements shown in FIG. 4C could all be duplicated for each diode laser, it is convenient to perform a monitoring and control function using the beam that includes all the diode laser outputs, as combined by multiplexer or star coupler 30. A portion of the combined beam is diverted by a beam splitter 77 and passes through a monitor etalon 78 (which may be a scanning Fabry-Perot etalon) to a detector 80. The detector signal is communicated to control electronics 82. The control electronics includes portions for providing temperature and current control for all the diode lasers in the transmitter. As noted above, a given diode laser may be illuminated by multiple modes, and it is important to lock it to a specific designated mode. The control parameters for locking a given diode laser to a particular mode can be established in a number of ways. In one possible approach, the other diode lasers are turned off and the monitor etalon is set to pass the particular mode. The temperature of the given diode laser or the DC component of the injection current (or both) are then varied over a range that includes at least one set of conditions where the diode laser's gain profile peaks at the particular mode wavelength.

In an operating communications system, it would be impractical to turn all of the diode lasers off. A more practical approach would be to apply a well defined modulation to the diode laser, such as amplitude modulation at a low frequency, such that the modulation pattern would easily be distinguished through a scanning monitor etalon. In this manner, the laser wavelength can be monitored while it is adjusted to the proper region.

When all the diode lasers have been locked to their respective modes, it is possible to monitor the overall operation by imposing a particular modulation pattern on the injection current for each diode laser in turn, and scanning the etalon to ensure that only the intended mode is modulated.

An alternative technique for locking the diode laser to a cavity mode would be to monitor a heterodyne signal obtained by beating the solid state laser and the diode laser on a photodiode. In either approach, the use of a reference laser makes it unnecessary to dither the diode laser frequency as might be typical for other stabilization techniques. Injection locking has the advantage over heterodyne stabilization in that the process actually narrows the frequency of the diode laser. Thus, the very narrow line widths of external cavity diode lasers are made possible without the complexity and additional size associated with external cavities.

Heterodyne Receiver

Figure 5:
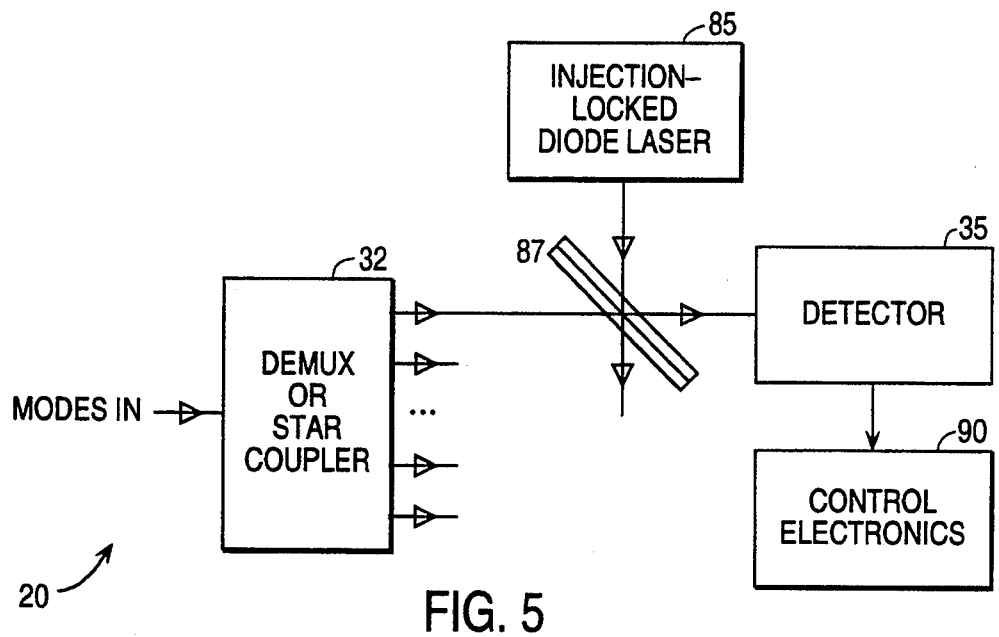
FIG. 5 is an optical and electronic block diagram of the receiver.

FIG. 5 is a block diagram of an embodiment of receiver 20. The preferred technique is heterodyne detection using a plurality of injection-locked diode lasers 85 (one of which is shown) as local oscillators. For detection of each mode, a portion of the incoming beam is combined at a beam combiner 87 with the output from the diode laser that is locked to the particular mode frequency. The beam, thus combined, is directed to a respective detector 35, the output signal of which is communicated to control electronics 90. Heterodyne detection is preferred for a number of reasons. First, where the spacing of the modes is close, it may not be possible to separate the modes by wavelength division multiplexing techniques, whereas heterodyne detection allows the extraction of the particular mode. Second, the intensity (and hence amplitude) of the diode laser (local oscillator) signal can be considerably greater than that of the incoming signal. Since the detected beat signal is proportional to the product of the incoming signal amplitude and the local oscillator amplitude, it is enhanced relative to a signal proportional to the incoming signal intensity.

Using locked diodes is preferred to using the master oscillator itself for the heterodyne detection. The latter would make the master oscillator more sensitive to feedback and would require separation of the frequencies with a wavelength demultiplexer, which as discussed above may not be feasible when the modes are closely spaced. Although it is possible to measure these signals at up to a GHz, it is preferred to measure signals in the MHz range. This is because the cost of an additional carrier frequency is small, and low frequencies reduce the amount of signal multiplexing and expensive high-speed modulators and multiplexers required. The line widths need to be small compared to the beat frequencies, say on the order of 100 KHz.

As mentioned above, separate master oscillators can be provided for the transmitter and receiver (as shown in FIG. 2), or the same master oscillator can be used at the transmitter and receiver. Depending on the alternative chosen, different considerations arise in connection with the mode frequencies used for heterodyne detection. If the receiver includes a separate master oscillator, the mode frequencies at the receiver for heterodyne detection need not be exactly equal to those at the transmitter. In some circumstances, it may be advantageous to have a slight offset between the frequencies, in which case the measured signal after heterodyne detection corresponds to the mixture of the signal and the offset frequency between the transmitter and receiver. The offset frequency may be removed electronically, for example, by mixing the detector signal with an oscillator signal at the offset frequency. To avoid ambiguity in the heterodyne process, it will typically be required that the offset in frequencies be less than one half of the frequency spacing between modes.

Even when the frequencies at the transmitter and receiver are not equal, it will typically be required that the frequency spacing between the modes at the transmitter be the same or nearly the same as the frequency spacing between the modes at the receiver. If the mode spacings are not the same, then the offset frequencies between transmitter and receiver will be different for various modes, creating greater complexity in extracting the actual signal from the heterodyne signal. The preferred mode of operation is to have the mode spacings equal, but if they differ, they should not differ by more than about 0.1 divided by the total number of modes used. Having mode spacings that are related by an integral multiplier or simple fractional multiplier is tolerable because in operation there will be combinations that have the same or nearly the same offsets, and they can be treated as though they are equal.

Several approaches may be used to determine frequencies for the receiver when there is only one master oscillator (at the transmitter, say). A multimode laser may be locked to a reference mode produced at the transmitter. This frequency must be present even if its not being modulated by data. Specifying a single frequency is not sufficient to define the entire set of frequencies. The mode frequency spacing can be defined by an electronic oscillator operating at the mode spacing frequency (or a multiple or submultiple of the mode spacing frequency) or by using two reference frequencies transmitted by the transmitter. Another approach is to lock the local oscillators (e.g., diode lasers) to fixed offset frequencies from the reference frequency or frequencies. The offsets can be defined by an electronic oscillator or oscillators. Yet another approach is to lock the local oscillators to the mode frequencies themselves, or a fixed offset from the mode frequencies. For bidirectional communication, the roles of transmitter and receiver are interchangeable. The single master oscillator is at either end, and the techniques just described are used to produce the heterodyne frequencies at the other end.

Spectral Analysis

The stabilized multimode laser of the present invention can be used in a system for a wide variety of applications in the fields of spectral analysis and Fourier transform analysis. The input to the system can consist of either an optical signal or an electrical signal which modulates an optical wave, either through a modulator or by modulating a laser. In any case, a signal in optical form is combined with the stable frequencies from the stabilized multimode laser to perform multichannel heterodyne detection. The result from each heterodyne detector is passed through a filter to remove the frequency components larger than the spacing between the frequencies of the multimode laser. Each heterodyne signal then represents a portion of the spectrum of the original signal, beat down to low frequencies. These low frequencies can be monitored by all-electrical techniques such as an oscilloscope, digitization, or spectrum analyzer. In this manner, frequencies present on optical or high frequency carriers may be monitored at low frequency. Similarly, the power spectrum of the input signal may be obtained.

Figure 6:
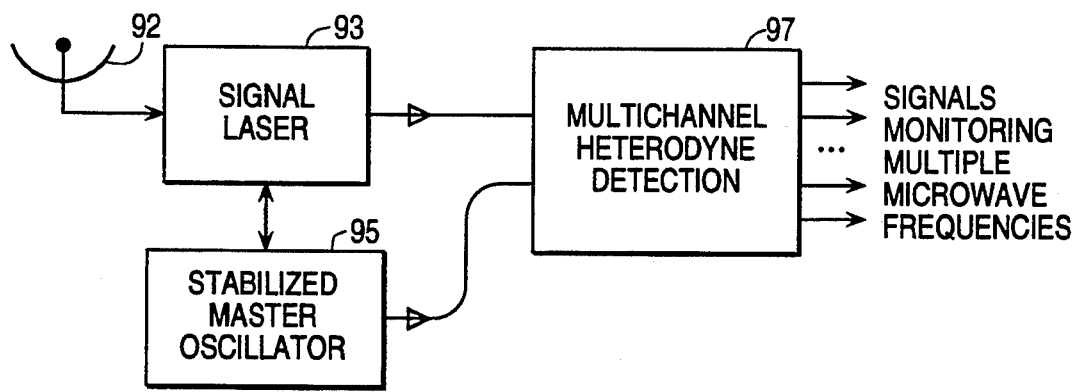
FIG. 6 is a block diagram of a multichannel radar monitoring system according to the present invention.

One example of this spectral analysis is a system for multi-channel radar monitoring wherein the electrical signal from an antenna is used to modulate a laser. FIG. 6 is an optical and electrical block diagram of such a system. In this system, the stabilized multimode laser of the present invention is used to monitor many different microwave frequencies without requiring separate microwave oscillators for each frequency or a single rapid-scanning microwave source. The voltage signal from a microwave antenna 92 is communicated to a stable signal laser 93, which is modulated by the antenna voltage. A stabilized master oscillator 95 (a stabilized multimode laser as described above) provides many stabilized cavity modes. The signal laser may be stabilized by being locked to one of the stabilized cavity modes of stabilized master oscillator 95.

The result is that the frequency of signal laser 93 is modulated over a range of microwave frequencies that is greater than (typically much greater than) the mode spacing so that the range spans many of the mode frequencies. The modulated signal laser output beam (the signal beam) and the stabilized modes from laser 95 are combined for simultaneous multichannel heterodyne detection (block 97). The resulting output is a plurality of signals monitoring respective microwave frequencies. These frequencies are equal to the differences between the utilized cavity modes and the unmodulated signal laser frequency (i.e., they are separated by the mode separation if all the modes in a given range are used, or multiples thereof if fewer than all the modes in a given range are used). As an example, the radar signal could cover a frequency range of several GHz, and the laser mode spacing may be 100 MHz. The system could then monitor tens of channels at the same time.

Figure 7A:
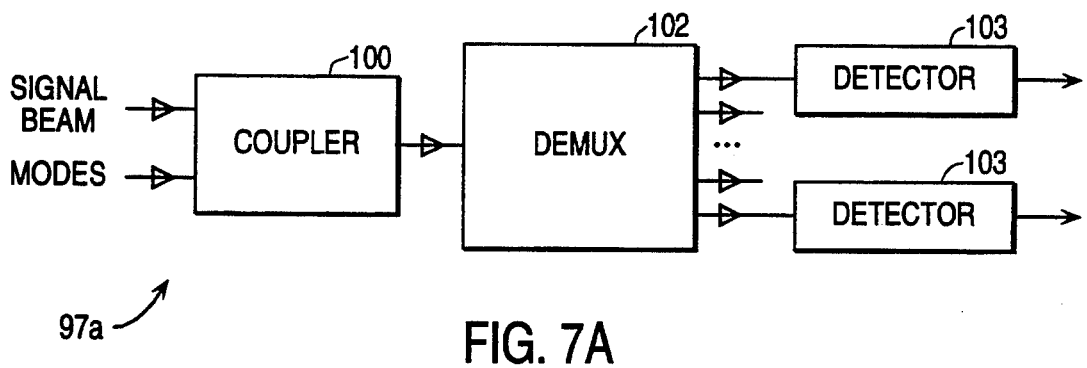
FIGS. 7A-7C are block diagrams showing alternative techniques for performing multichannel heterodyne detection in connection with the radar monitoring.
Figure 7B:
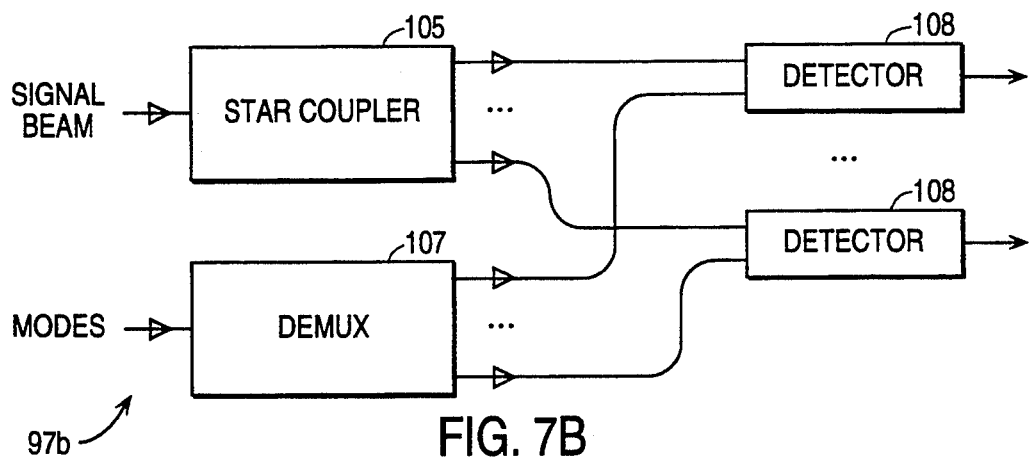
Figure 7C:
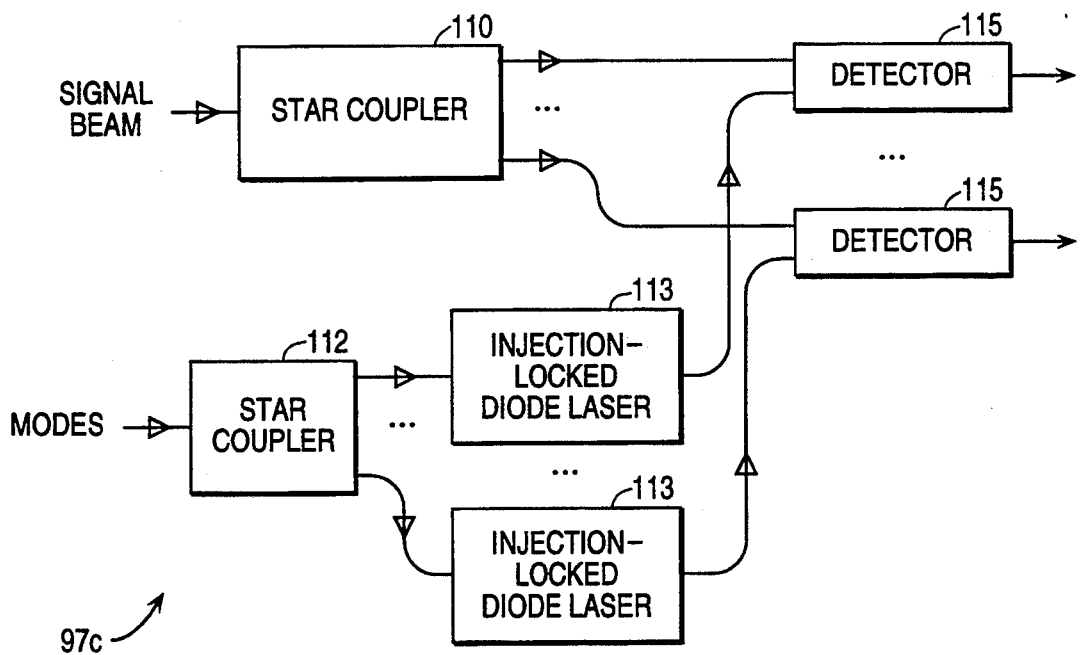

FIGS. 7A–7C illustrate various embodiments for performing the multichannel heterodyne detection based on the modulated beam from signal laser 93 and the stabilized cavity modes from stabilized master oscillator 95. FIG. 7A shows an embodiment 97a where the signal beam and the modes are combined at a coupler 100, and the frequencies separated at a demultiplexer 102. The separated modes are communicated to an array of detectors 103 (two of which are shown). FIG. 7B shows an embodiment 97b where the signal is split at a star coupler 105, while the modes are separated at a demultiplexer 107. Respective components of the signal from star coupler 105 are combined with respective modes from multiplexer 107 at respective detectors 108. FIG. 7C shows an embodiment 97c where the signal beam is divided at a star coupler 110 as above, but the light from the stabilized multimode laser is divided by a star coupler 112 and the components are used to injection lock a number of diode lasers 113, as for example in the manner discussed above. Each injection-locked diode laser provides an output at one of the modes, and the outputs from star coupler 110 are combined with respective outputs from the injection-locked diode lasers at respective detectors 115.

Spread Spectrum Communications

Figure 8:
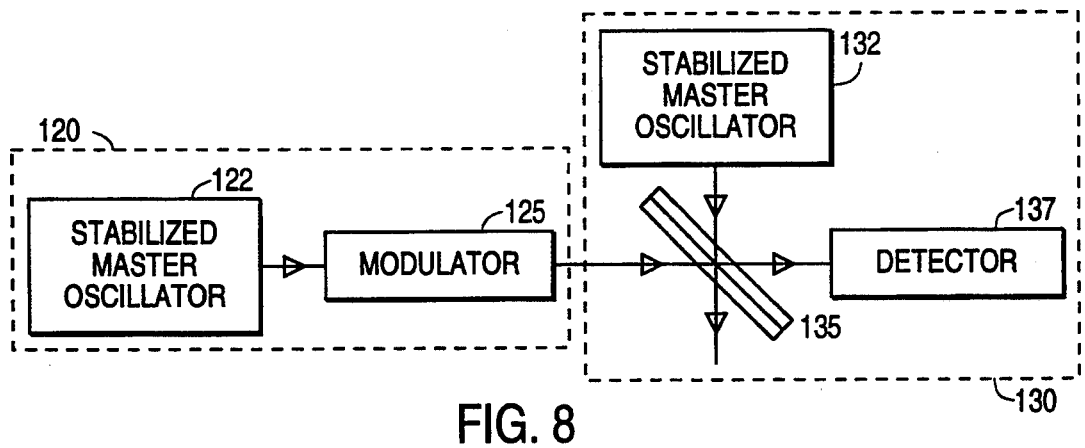
FIG. 8 is a block diagram of a spread spectrum communications system according to the present invention.

For certain applications where it is important to avoid interception of communications, it can be useful to artificially spread the bandwidth of the communications signal, in the manner of a spread spectrum. FIG. 8 is a block diagram of a spread spectrum communications system using the stabilized multimode laser of the present invention. The techniques are generally those described above, but there is no need to separate the modes so that each can be modulated by a different signal. Rather, a transmitter 120 comprises a stabilized master oscillator 122, the output of which is modulated by a single modulator 125, producing hundreds or thousands of individually modulated frequencies. Detection at a receiver 130 is performed coherently through heterodyne detection against another master oscillator 132 by combining the modulated beam and the beam from master oscillator 132 at a beam combiner 135 and directing the combined beam to a single detector 137. Because all of the frequencies add coherently, the detected signal is proportional to the sum of the amplitudes of all of the individual frequencies. Any detection that is performed without the proper multi-frequency heterodyne receiver can only detect a single frequency, and the power in that single frequency can be orders of magnitude smaller, and that much harder to detect. Because of the very large number of frequencies possible with stabilized multimode laser source of the present invention, the effectiveness of spread spectrum techniques with this source can be very good.

Conclusion

In conclusion, it can be seen that the present invention provides an elegant and reliable technique for generating a large number of stable frequencies for applications such as fiber optic communications. When based on an $Er^{3+}$-doped glass laser, the frequencies are matched to the bandwidth of available amplifiers. All of the frequencies are defined by a common reference, the laser cavity and an atomic line, leading to good frequency stability and allowing correction of all frequencies through adjustment of a single carrier. Use of this source to injection lock diode lasers greatly enhances the stability, linewidth, tuning, and stability to high modulation of available Fabry-Perot, DFB, and DBR diode lasers. Additionally, the diodes can act as very good optical isolators against feedback into the master oscillator frequency reference source.

Multifrequency optical sources have other useful applications for optical information handling, optical processing, and optical computing. While the cavity modes of a laser have in the past been used for spectroscopy, the optical communication embodiments of the present invention use the cavity modes to convey information as a modulated (or subcarrier) form. That is, while for the spectroscopic applications, the information carried is at optical frequencies, these embodiments deal with frequencies in the range of MHz or GHz on an optical carrier. Moreover, the multifrequency source of the present invention is useful even when the modes are not individually modulated, but serve only as heterodyne reference frequencies, as for example in the radar-monitoring application described above.

While the above is a complete description of the preferred embodiments of the present invention, various modifications, alternative constructions, and equivalents can be used. For example, while FIG. 4A shows separate amplifiers for the modes, a single amplifier before the demultiplexer could be used. Therefore, the above description and illustration should not be taken as limiting the scope of the invention which is defined by the claims.

What is claimed is:

1. A method of communicating information comprising the steps of:
   providing a mode-coupled master laser having a cavity capable of supporting a plurality of modes, said modes being characterized by respective mode frequencies that differ from one another;
   stabilizing said cavity so that said mode frequencies are stabilized; and
   modulating at least one of the mode frequencies with information to be communicated.

2. The method of claim 1 wherein said mode frequencies are separated by a frequency interval in the range of 50 MHz to 100 GHz.

3. The method of claim 1 wherein the information has a spectral content in the range of 1 KHz to 10 GHz.

4. The method of claim 1 wherein said master laser is a solid-state laser.

5. The method of claim 4 wherein said master laser has a monolithic cavity.

6. The method of claim 4 wherein said master laser comprises a body of erbium-doped glass.

7. The method of claim 1 wherein said master laser operates in the infrared.

8. The method of claim 1 wherein said cavity is a standing wave cavity.

9. The method of claim 1, and further comprising the steps of amplifying at least some of said modes.

10. An optical source comprising:
    a mode-coupled master laser having a stabilized cavity capable of supporting a plurality of modes, said modes being characterized by respective mode frequencies that differ from one another; and
    a plurality of slave lasers, each locked to a different one of said modes to establish a respective frequency for that slave laser.

11. The source of claim 10 wherein each of said slave lasers is adapted to be optically coupled to a communications medium to define a respective communication channel for that slave laser characterized by the frequency for that slave laser.

12. The source of claim 11 wherein each of said slave lasers has an input terminal adapted to be coupled to a respective signal source that generates a respective signal for communication on that slave laser's respective channel.

13. A transmitter system for coupling a plurality of N input signals to an optical communications medium comprising:
- a mode-coupled master laser having a stabilized cavity capable of supporting a plurality of at least N modes, said modes being characterized by respective mode frequencies that differ from one another;
- means for coupling optical power at said mode frequencies to the communications medium; and
- means for modulating said optical power at N of said mode frequencies according to the N input signals.

14. The transmitter system of claim 13 wherein said master laser is a solid-state laser.

15. The transmitter system of claim 14 wherein said master laser has a monolithic cavity.

16. The transmitter system of claim 14 wherein said master laser comprises a body of erbium-doped glass.

17. The transmitter system of claim 13 wherein said master laser operates in the infrared.

18. The transmitter system of claim 13 wherein said cavity is a standing wave cavity.

19. The transmitter system of claim 13, and further comprising means for amplifying at least some of said modes.

20. The transmitter system of claim 19 wherein said means for amplifying comprises:
- a plurality of slave lasers, each locked to a different one of said modes.

21. The transmitter system of claim 13 wherein said means for coupling comprises:
- a plurality of slave lasers, each locked to a different one of said modes to establish a respective carrier frequency for that slave laser, said slave lasers being optically coupled to the communications medium.

22. The transmitter system of claim 21 wherein said means for modulating comprises:
- means for modulating the output of said slave lasers.

23. A transmitter system for use with an optical communications medium comprising:
- a mode-coupled master laser having a stabilized cavity capable of supporting a plurality of modes, said modes being characterized by respective mode frequencies that differ from one another; and
- a plurality of slave lasers, each locked to a different one of said modes to establish a respective carrier frequency for that slave laser;
- each of said slave lasers adapted to be optically coupled to the communications medium to define a respective communication channel for that slave laser characterized by the carrier frequency for that slave laser;
- each of said slave lasers having an input terminal adapted to be coupled to a respective signal source that generates a respective signal for communication on that slave laser's respective channel.

24. A receiver system for detecting signals on an optical communications medium having a plurality of N channels characterized by respective carrier frequencies that differ from each other, comprising:
- a mode-coupled master laser having a stabilized cavity capable of supporting a plurality of at least N modes, said N modes being characterized by N respective mode frequencies that have a predetermined relationship with the N carrier frequencies; and
- a plurality of N photodetectors, each having incident thereon light at a respective one of said mode frequencies and optical signals from the communications medium so as to provide an electrical signal representing signals on a respective channel.

25. The receiver system of claim 24, and further comprising:
- a plurality of N slave lasers, each locked to a different one of said modes; and
- means for directing light from each of said slave lasers onto a respective one of said photodetectors.

26. A receiver system for use with an optical communications medium comprising:
- a mode-coupled master laser having a stabilized cavity capable of supporting a plurality of modes, said modes being characterized by respective mode frequencies that differ from one another;
- a plurality of slave lasers, each locked to a different one of said modes to establish a respective detection frequency; and
- a plurality of photodetectors, each having incident thereon light from a respective one of said slave lasers and optical signals from the communications medium so as to provide an electrical signal representing signals on a respective channel characterized by the detection frequency for the slave laser whose light is incident on that photodetector.

27. Apparatus for monitoring, at a plurality of discrete frequencies, an input communication signal, the apparatus comprising:
- a mode-coupled stabilized multimode laser capable of providing a plurality of stabilized optical frequencies over a range;
- a signal laser having an output in the range of said stabilized multimode laser;
- means for modulating said signal laser with the input communication signal; and
- means for performing heterodyne detection between said signal laser and said stabilized multimode laser to provide a plurality of output signals.

28. The apparatus of claim 27 wherein said stabilized multimode laser comprises:
- a master laser having a cavity capable of supporting a plurality of modes, said modes being characterized by respective mode frequencies that differ from one another; and
- means for stabilizing said cavity so that said mode frequencies are stabilized.

29. The apparatus of claim 27 wherein said means for performing heterodyne detection comprises:
- a plurality of detectors;
- means for combining the output of said stabilized multimode laser and the output of said signal laser; and
- a wavelength demultiplexer receiving the combined output and directing components near the stabilized frequencies to respective ones of the detectors.

30. The apparatus of claim 27 wherein said means for performing heterodyne detection comprises:
- a plurality of detectors;
- a wavelength demultiplexer receiving the output from said stabilized multimode laser and providing spatially separated components at a plurality of the stabilized frequencies;
- means for dividing the output from said signal laser to provide a corresponding plurality of output portions; and means for combining said components from said wavelength demultiplexer and said output portions at respective ones of said detectors.

31. The apparatus of claim 27 wherein said means for performing heterodyne detection comprises:
a plurality of detectors;
a plurality of slave lasers, each locked to a different one of said stabilized frequencies;
means for dividing the output from said signal laser to provide a corresponding plurality of output portions; and
means for combining outputs from said slave lasers and said output portions at respective ones of said detectors.

32. The apparatus of claim 27 wherein the input communication signal is a microwave signal.

33. Apparatus for performing spectral analysis of an input optical signal comprising:
a stabilized mode-coupled multimode laser capable of providing a plurality of stabilized optical frequencies over a range; and
means for performing heterodyne detection between the input optical signal and said stabilized multimode laser to provide a plurality of output signals.

34. The apparatus of claim 33 wherein said stabilized multimode laser comprises:
a master laser having a cavity capable of supporting a plurality of modes, said modes being characterized by respective mode frequencies that differ from one another; and
means for stabilizing said cavity so that said mode frequencies are stabilized.

35. The apparatus of claim 33 wherein said means for performing heterodyne detection comprises:
a plurality of detectors;
means for combining the output of said stabilized multimode laser and the input optical signal; and
a wavelength demultiplexer receiving the combined output and directing components near the stabilized frequencies to respective ones of the detectors.

36. The apparatus of claim 33 wherein said means for performing heterodyne detection comprises:
a plurality of detectors;
a wavelength demultiplexer receiving the output from said stabilized multimode laser and providing spatially separated components at a plurality of the stabilized frequencies;
means for dividing the input optical signal to provide a corresponding plurality of output portions; and
means for combining said components from said wavelength demultiplexer and said output portions at respective ones of said detectors.

37. The apparatus of claim 33 wherein said means for performing heterodyne detection comprises:
a plurality of detectors;
a plurality of slave lasers, each locked to a different one of said stabilized frequencies;
means for dividing the input optical signal to provide a corresponding plurality of output portions; and
means for combining outputs from said slave lasers and said output portions at respective ones of said detectors.

38. A spread spectrum communication system for communicating an input signal on an optical communications medium comprising:
a first mode-coupled master laser having a stabilized cavity capable of supporting a plurality of modes, said modes being characterized by respective mode frequencies that differ from one another;
means for coupling optical power at at least some of said mode frequencies to the communications medium;
means for modulating said optical power according to the input signal;
a second mode-coupled master laser having a stabilized cavity capable of supporting a plurality of modes having mode frequencies having a predetermined relationship with the mode frequencies coupled to the communications medium; and
a photodetector having incident thereon (a) light from said second master laser, and (b) optical signals from the communications medium so as to provide a detectible electrical signal representing the input signal.

39. A master oscillator comprising:
a mode-coupled solid state laser having a cavity capable of supporting a plurality of modes, said modes being characterized by respective mode frequencies that differ from one another; and
means for stabilizing said cavity so that said mode frequencies are stabilized.

40. The master oscillator of claim 39 wherein said solid state laser has a monolithic cavity.

* * * * *